United States Patent
Chen (10) Patent No.: US 9,382,143 B2
(45) Date of Patent: Jul. 5, 2016

(54) SOLIDIFYING SLUDGE

(75) Inventor: Bing Chen, Shanghai (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 45 days.

(21) Appl. No.: 14/241,004

(22) PCT Filed: Nov. 2, 2011

(86) PCT No.: PCT/CN2011/081686
§ 371 (c)(1),
(2), (4) Date: May 15, 2014

(87) PCT Pub. No.: WO2013/063774
PCT Pub. Date: May 10, 2013

(65) Prior Publication Data
US 2014/0245930 A1    Sep. 4, 2014

(51) Int. Cl.
C04B 28/24        (2006.01)
C02F 11/00        (2006.01)
C04B 28/02        (2006.01)

(52) U.S. Cl.
CPC ............ *C02F 11/008* (2013.01); *C04B 28/02* (2013.01); *C04B 28/24* (2013.01); *Y02W 30/91* (2015.05); *Y02W 30/92* (2015.05)

(58) Field of Classification Search
CPC .............................. C02F 11/008; C04B 28/24
See application file for complete search history.

(56) References Cited

U.S. PATENT DOCUMENTS

| | | | | |
|---|---|---|---|---|
| 3,947,284 A * | 3/1976 | Kitsugi | ............... | C02F 11/008 106/661 |
| 4,089,831 A * | 5/1978 | Chambers | ............. | C02F 1/5227 209/5 |
| 2002/0043505 A1* | 4/2002 | Olson | ................... | C02F 1/5245 210/749 |
| 2007/0138106 A1* | 6/2007 | Buddenberg | ............ | C02F 11/14 210/709 |
| 2009/0036728 A1 | 2/2009 | Birdwell | | |
| 2010/0098493 A1 | 4/2010 | McColl et al. | | |

FOREIGN PATENT DOCUMENTS

| | | |
|---|---|---|
| CN | 101081718 A | 12/2007 |
| CN | 101172749 A | 5/2008 |
| CN | 101220590 A | 7/2008 |
| CN | 101602567 A | 12/2009 |
| CN | 101955345 A | 1/2011 |
| CN | 102060480 A | 5/2011 |

OTHER PUBLICATIONS

"Slag Cement and Fly Ash," Slag Cement Association, pp. 2 (2002).
"UCARFLOC Polymers," The Dow Chemical Company, pp. 1-8 (Apr. 2003).

(Continued)

*Primary Examiner* — Paul Marcantoni
(74) *Attorney, Agent, or Firm* — Foley & Lardner LLP (57) ABSTRACT

Embodiments provided herein relate to removing liquid from soil or other moisture rich media. In some embodiments, a method for solidifying sludge is provided and involves providing a sludge, fluidizing the sludge to form a fluidized sludge, adding a gelling agent to the fluidized sludge in an amount sufficient to form a slurry, and adding a dewatering agent to the slurry in an amount sufficient to dewater the slurry, thereby solidifying the sludge.

18 Claims, 3 Drawing Sheets

(56) References Cited

OTHER PUBLICATIONS

Bin, L., et al., "Study on Mechanical Dewatering Performance of Sediment from a Lake in Wuhan," China Water & Wastewater, vol. 24, No. 3, pp. 68-71 (Feb. 2008).

Chen, L., "Application and Research of Vacuum combined pile load preloading method," Journal of Highway and Transportation Research and Development, vol. 49, No. 1, pp. 90-93 (2009).

Gopalakrishnan, S., et al., "Electrokinetically Enhanced Vacuum Dewatering of Mineral Slurries," Filtration & Separation, vol. 33, Issue 10, pp. 929-932 (1996).

Gopalakrishnan, S., et al., "Optimal off-time in interrupted electro-osmotic dewatering," Separation Technology, vol. 6, Issue 3, pp. 197-200 (1996).

Han-Qiao, L., "Study on the Use of Waste Incineration Fly Ash for Sediment Solidification," 4th International Conference on Bioinformatics and Biomedical Engineering (iCBBE), pp. 1-3, IEEE (2010).

Huo, S., et al., "Environmental protection dredging sediment drying technology research," Environmental Engineering, vol. 125, No. 15, pp. 72-75 (Oct. 2007).

International Search Report and Written Opinion dated Aug. 30, 2012, received in International application No. PCT.CN2011/081686.

Umezaki, T., et al., "A New Method for Dewatering Soil with High Water Content Using Gravity and Atmospheric Pressure," IS-OSAKA 2004, pp. 6 (Jun. 2-4, 2004) (copy not found).

Yuan, Y., and Haizhen, Y., "Study Progress on Sludge Chemical Conditioning and Mechanical Dewatering," Shanghai Environmentsl Sciences, vol. 22, No. 7, pp. 499-507 (Jul. 2003).

Zhang, C., et al., "Sludge reclamation treatment and its research progress," Subgrade Engineering, vol. 30, No. 1, pp. 12-14 (2007).

Zhi-Liang, D., et al., "Mechanism and Theoretical Research on Vacuum and Vacuum-Load Consolidation of Soft Ground," Port & Waterway Engineering, No. 9, Serial No. 380, pp. 83-91 (Sep. 2005).

\* cited by examiner

SOLIDIFYING SLUDGE

CROSS-REFERENCE TO RELATED APPLICATIONS

This application is the U.S. National Phase entry under 35 U.S.C. §371 of International Application PCT/CN/2011/081686, filed Nov. 2, 2011, entitled "SOLIDIFYING SLUDGE," the entirety of which is incorporated herein by reference.

TECHNICAL FIELD

The described technology relates generally to dewatering and/or solidifying of sludge.

BACKGROUND

Sludge can be used for land reclamation as well as for providing a source of soil for other uses. There are a variety of ways of removing water from sludge.

One option is engineering physical drainage systems into the sludge. This mainly uses mechanical actions, such as applying a pressure, building up drainage passage ways, etc., to force the large amount of water bound in the slurry to discharge, thus achieving a slurry-water separation.

Another option is a mechanical dewatering approach. This can be divided into three main categories of vacuum filtration dewatering, pressure filtration dewatering, and centrifugation dewatering according to their dewatering principles.

Still another option is chemical flocculation dewatering. In this approach, a flocculant is dosed into the slurry, which serves the functions of compressing the electric double layer and adsorption-bridging, to make solid phases in the slurry mixture system gather together and form flocs to carry out a "destabilization", thus achieving a slurry-water separation.

Yet another option is electro-osmosis well point drying technologies. Electro-osmosis involves using the direct current energy of clay type soil to make the water in the pores of the soil move towards the cathode. The dredged slurries for environment protection are generally all clay-type soil with a permeability coefficient less than $1.0 \times 10^{-4}$ cm/s, and the electro-osmosis well point dewatering system used includes a well point pumping device and an electric power system device.

SUMMARY

In some embodiments, a method for solidifying sludge is provided. The method can include providing a sludge, fluidizing the sludge to form a fluidized sludge, adding a gelling agent to the fluidized sludge in an amount sufficient to form a slurry, and adding a dewatering agent to the slurry in an amount sufficient to dewater the slurry, thereby solidifying the sludge.

In some embodiments, a gelling agent is provided. The agent can include cement clinker, fly ash, lime, gypsum, and sodium sulfate.

In some embodiments, a dewatering agent is provided. The dewatering agent can include a flocculant including at least one of a polyethylene oxide and a polyacrylamide, and a surfactant including at least one of an alkylphenol polyethylene ether and a lignosulfonate.

In some embodiments, a treated soil composition is provided. The composition can include soil, a gelling agent, and a dewatering agent.

In some embodiments, a device for solidifying sludge is provided. The device can include a first inlet configured to receive sludge, a second inlet configured to receive a gelling agent, a gelling agent reservoir in communication with the second inlet, wherein the gelling agent reservoir is configured to contain the gelling agent, a mixing chamber in communication with the first inlet and the second inlet, a third inlet configured to receive a dewatering agent, wherein the third inlet is configured to open into the mixing chamber, and a dewatering agent reservoir in communication with the third inlet. The dewatering agent reservoir is configured to contain the dewatering agent. The mixing chamber can include an outlet configured to allow a substance including the gelling agent and the dewatering agent to be removed from the mixing chamber.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In some embodiments, a method is provided for dewatering and/or solidifying a sludge having a high water content. In some embodiments, the dewatered sludge can have a desired load bearing capacity.

In some embodiments, the method includes two parts or processes: (1) a "construction" process—which is a fluidization treatment of the dredged sludge, to make it pumpable (for hydraulic land-fill) to a place where soil material is desired; and (2) a formulation process for a solidification treating agent—a formulation of a gelling agent and a dewatering agent. In some embodiments, the formulation includes cement clinker as a main gelling component and a polyethylene oxide as a main dewatering component.

Figure 1:
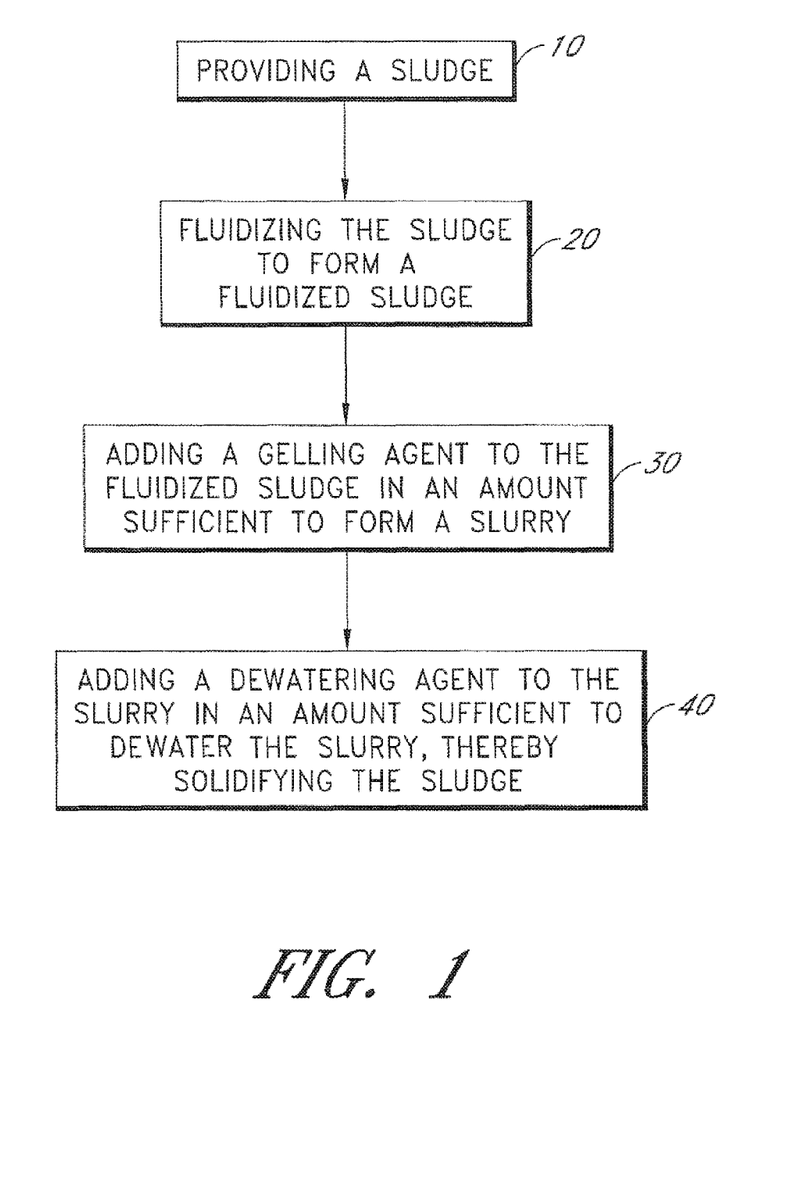
FIG. 1 is a flow chart depicting some embodiments of methods for dewatering and/or solidification.

An example of such a method is outlined in FIG. 1, which is a flow chart depicting some embodiments of methods for dewatering and/or solidification. As shown in FIG. 1, solidification can be achieved by providing (e.g., gathering, locating, obtaining, etc.) a sludge (block 10), fluidizing the sludge to form a fluidized sludge (block 20), adding a gelling agent to the fluidized sludge in an amount sufficient to form a slurry (block 30), and adding a dewatering agent to the slurry in an amount sufficient to dewater the slurry, thereby solidifying the sludge (block 40). In some embodiments, the sludge can be provided in a tank, a container, a railroad car, a vat, a lake, a pond, a cistern, etc.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In some embodiments, the method may further include applying the slurry with the dewatering agent to a location where a solidified sludge is desired. In some embodiments, the method may further include allowing the slurry with the dewatering agent to solidify at the location into a solidified sludge.

In some embodiments, the slurry can solidify within 7 days after adding the dewatering agent. In some embodiments, the slurry can be acceptably solidified within about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, or 31 days. In some embodiments, the term "solidify" denotes that the slurry can be capable of supporting the weight of commercial construction equipment. In some embodiments, the term denotes that the soil can be moved and shaped as desired and it will retain its shape. In some embodiments, the term denotes that the soil can be solid enough for earthmoving equipment to be used on the soil (such a bulldozers and backhoes).

In some embodiments, the amount of the gelling agent used can be less than 10% by weight of the fluidized sludge, e.g., about 9, 8, 7, 6, 5, 4, 3, 2, 1, or 0.1 percent or less, including any range defined between any two of the preceding values and any range that can be less than any of the preceding values. In some embodiments, the amount of the gelling agent used can be less than 5% by weight of the fluidized sludge.

In some embodiments, the method may include adding a surfactant, a flocculant, a surfactant, or combinations thereof to the slurry. In some embodiments, the flocculant includes at least one of a polyethylene oxide or a polyacrylamide. In some embodiments, the surfactant includes at least one of an alkylphenol polyethylene ether or a lignosulfonate.

In some embodiments, the dewatering process may occur concurrently with a solidifying process. In some embodiments, the dewatering process may occur simultaneously with a solidifying process. In some embodiments, the dewatering process may start before the solidifying process and continue during the solidifying process. In some embodiments, the solidifying process may start before the dewatering process and continue during the dewatering process.

In some embodiments, the fluidized sludge includes a water content between about 150% to about 350% of the sludge (by weight). In some embodiments, one can adjust the water content of the sludge to about 150% to about 350%. In some embodiments, the fluidized sludge includes a water content between about 180% to about 300% of the sludge (by weight). In some embodiments, the fluidized sludge includes a water content between about 200% to about 280% of the sludge (by weight). In some embodiments, the fluidized sludge includes a water content between about 220% to about 250% of the sludge (by weight).

In some embodiments, the gelling agent includes concrete. In some embodiments, the gelling agent may include at least one of: cement clinker, fly ash, lime, gypsum, sodium sulfate, or any combination thereof. In some embodiments, the gelling agent may include cement clinker, fly ash, lime, gypsum, and sodium sulfate. In some embodiments, the gelling agent may include about 20-50% cement clinker, about 40-70% fly ash, about 4-10% lime, about 2-6% gypsum, and about 4-6% sodium sulfate by weight. In some embodiments, the cement clinker may include silicate cement clinker, ash of grade II or higher, quicklime powder, industrial grade gypsum, and industrial grade sodium sulfate. In some embodiments, one or more of the ingredients may be added sequentially. In some embodiments, one or more of the ingredients may be added in a combined mixture. In some embodiments, the gelling agent may be added in an amount of about 4-8% by weight of the initially provided sludge.

In some embodiments, the dewatering agent may include a flocculant and optionally a surfactant. The flocculant may include at least one compound selected from the group of: polyethylene oxide and polyacrylamide. The surfactant may include at least one compound selected form the group of: alkylphenol polyethylene ether and lignosulfonate. In some embodiments, the concentration by weight of dewatering agent can be about 1-10% polyethylene oxide, about 1-5% polyacrylamide, about 1 to 5% alkylphenol polyethylene ether, and about 2-30% lignosulfonate. In some embodiments, the concentration by weight of dewatering agent can be about 1-3% polyethylene oxide, about 0.5-3% polyacrylamide, about 0.5 to 1% alkylphenol polyethylene ether, and about 10-25% lignosulfonate. In some embodiments, the concentration by weight of dewatering agent can be about 2% polyethylene oxide, about 1-2% polyacrylamide, about 0.6 to 0.9% alkylphenol polyethylene ether, and about 15-20% lignosulfonate. In some embodiments, the dewatering agent may include polyethylene oxide. In some embodiments, the amount of dewatering agent added can be about 0.01-0.05% by weight of the slurry.

In some embodiments, the gelling agent, the dewatering agent, and the sludge may be combined in a single chamber. In some embodiments, all of the ingredients may be mixed together concurrently or simultaneously. In some embodiments, one or more of the ingredients may be mixed with the slurry and/or soil before another ingredient is added.

In some embodiments, a form of treated soil is provided. In some embodiments, the treated soil composition can include soil, a gelling agent, and a dewatering agent. In some embodiments, the soil includes dredged soil. In some embodiments, the gelling agent includes: cement clinker, fly ash, lime, gypsum, and sodium sulfate. In some embodiments, the dewatering agent includes: polyethylene oxide, polyacrylamide, alkylphenol polyethylene ether, and lignosulfonate. In some embodiments, the gelling agent includes about 20-50% cement clinker, about 40-70% fly ash, about 4-10% lime, about 2-6% gypsum, and about 4-6% sodium sulfate by weight.

In some embodiments, the sludge can be dredged sludge. Dredged sludge can be used for hydraulic land-fill to reclaim land from sea. In some embodiments, dredge sludge has a high water content and a high clay content.

In some embodiments, the present methods provide a technical solution for rapidly dewatering and/or solidifying dredged sludge. This can be used to form a foundation having an acceptable strength and bearing capacity for construction purposes.

In some embodiments, the dredged sludge can be first subjected to a fluidization treatment to meet the requirements for pumping (hydraulic land-fill). During the pumping (hydraulic land-fill) process cement can be used as a main gelling material. The cement can be mixed with the soil to form a slurry. A dewatering agent with polyethylene oxide as the main component can be mixed with the slurry, and the slurry so formed can be pumped (hydraulic land-filled) to a place where soil material can be desired. In some embodiments, the bearing capacity of the sludge would meet the requirements for the next stage of construction within about 7 days (e.g., it will support and be moveable by heavy earth moving construction equipment and machinery, such as bulldozers and backhoes).

In some embodiments, the method includes the following: first adjusting the water content of the dredged sludge to about 180%-300%, so as to make it flowable and pumpable (for hydraulic land-fill). Second, transporting the same by pumping (hydraulic land-fill) and mixing in it the gelling agent in an amount of about 4-8% by weight of the sludge at the inlet end of the transporting pump. A slurry of a high water content can be formed by the pumping (hydraulic land-fill) process. One can then incorporate the dewatering agent in an amount of about 0.01-0.05% by weight of the sludge at the end of the transporting pump. One can then pump (e.g., hydraulic land-filling) the mixture so formed to a place where soil material can be desired, so as to achieve the rapid dewatering/solidification of the sludge.

In some embodiments, the technology disclosed herein simplifies the procedure for mixing the sludge and the gelling agent into a process of pumping during the fluidization treatment of the sludge. This forms a slurry having a high water content to facilitate the addition of the dewatering agent for a rapid dewatering treatment.

In some embodiments, the methods herein provide a significant consolidation effect with a small amount of the gelling agent incorporated therein at, optionally, low costs. In some prior arrangements, the amount of a gelling agent incorporated for sludge treatments can be generally above about 10%, and the gelling agents themselves are relatively high in price. However, some of the embodiments provided herein involve a gelling agent that uses cement clinker compounded with fly ash, (with the amount of fly ash being above about 50%), thereby reducing the cost of the gelling agent itself. In addition, in some embodiments, the amount of a gelling agent used can be much less, e.g., less than about 10%, and even less than about 4% of the sludge used.

In some embodiments, the methods herein provide a rapid dewatering approach with significant effectiveness. Traditionally, it could take several months for dredge sludge to be dewatered to a water content that was acceptable for construction. In addition, the cost of dewatering has, in the past, been very high. However, some of the present embodiments make use of both a surfactant and a flocculant so that the slurry can be rapidly separated from water. In some embodiments, this also involves a thorough mixing during the pumping process. In some embodiments, this can achieve rapid dewatering of the sludge.

Gelling Agents

In some embodiments, and not intending to be limited by theory, an underlying principle of some of the gelling agents can be as follows: dicalcium silicate and tricalcium silicate, which are hydration products formed by the hydration of the silicate cement, can be used to absorb a part of water, and a volcanic ash reaction can be carried out with the fly ash under the activation of the lime and the sulfate. From them, crystalline mass points and a spatial network are formed, which serve during the early period as passageways to facilitate the discharge of water from the sludge. They can also serve as a framework during the latter period, which can be beneficial in improving the consolidation strength.

While a variety of gelling agents can be used, in some embodiments, the gelling agent includes cement clinker, fly ash, lime, gypsum, and sodium sulfate. In some embodiments, the gelling agent includes about 20-50% cement clinker, about 40-70% fly ash, about 4-10% lime, about 2-6% gypsum, and about 4-6% sodium sulfate by weight. In some embodiments, the gelling agent includes about 10-60% cement clinker, about 30-80% fly ash, about 1-20% lime, about 1-20% gypsum, and about 1-20% sodium sulfate by weight. In some embodiments, the gelling agent includes about 30-40% cement clinker, about 50-60% fly ash, about 5-9% lime, about 3-5% gypsum, and about 4-6% sodium sulfate by weight. In some embodiments, the cement clinker includes silicate cement clinker, the fly ash includes ash of grade II or higher, the lime includes quicklime powder, the gypsum includes industrial grade gypsum, and the sodium sulfate includes industrial grade sodium sulfate.

In some embodiments, the cement clinker includes silicate cement clinker. In some embodiments, the fly ash includes ash of grade II or higher. In some embodiments, the lime includes quicklime powder, the gypsum includes industrial grade gypsum. In some embodiments, the sodium sulfate includes industrial grade sodium sulfate.

In some embodiments the amount of gelling agent used can be between 1 and 20%, for example about 2, 3, 4, 5, 6, 7, 8, 9, 10, 11, 12, 13, 14, 15, 16, 17, 18, or 19 percent, including any amount defined between any two of the preceding values. In some embodiments, the range can be about 3 to about 10% or about 4 to about 8% by weight of the sludge at the inlet end of the transporting pump.

Dewatering Agents

In some embodiments, and not intending to be limited by theory, underlying principles of the dewatering aid are that 1) the double effects of polyethylene oxide and polyacrylamide are used to achieve rapid separation of water from the slurry formed and to change the slurry from a flowing consistency into the consistency similar to a dry and hard mortar, and 2) that alkylphenol polyethylene ether and lignosulfonate serve as a surfactant, to enhance the effects of dewatering and rapid consolidation.

While a variety of dewatering agents can be used, in some embodiments, the dewatering agent includes a flocculant including at least one of polyethylene oxide and polyacrylamide, and a surfactant including at least one of an alkylphenol polyethylene ether and a lignosulfonate.

In some embodiments, the dewatering agent includes polyethylene oxide. In some embodiments, the dewatering agent includes polyacrylamide. In some embodiments, the dewatering agent includes alkylphenol polyethylene ether. In some embodiments, the dewatering agent includes lignosulfonate. In some embodiments, the dewatering agent includes a flocculant. In some embodiments, the dewatering agent includes a surfactant. In some embodiments, the dewatering agent includes a surfactant and a flocculant.

In some embodiments, the dewatering agent includes about 1-3% polyethylene oxide, about 0.5-3% polyacrylamide, about 0.5 to 1% alkylphenol polyethylene ether, and about 10-25% lignosulfonate by weight. In some embodiments, the dewatering agent includes about 1-10% polyethylene oxide, about 0.5-5% polyacrylamide, about 0.5 to 5% alkylphenol polyethylene ether, and about 5-40% lignosulfonate by weight. In some embodiments, the dewatering agent includes about 2% polyethylene oxide, about 1-2% polyacrylamide, about 0.6 to about 0.9% alkylphenol polyethylene ether, and about 15-20% lignosulfonate by weight.

In some embodiments, the amount of the dewatering agent can be between about 0.001 and about 0.5% by weight of the sludge at the end of the transporting pump. In some embodiments, it can be about 0.001, 0.005, 0.01, 0.02, 0.03, 0.04, 0.05, 0.06, 0.07, 0.08, 0.09, 0.1, 0.2, 0.3, 0.4 or 0.5, including any range defined between any of the two preceding values. In some embodiments, the amount can be between about 0.01 to about 0.05, about 0.02 to about 0.04, or about 0.03%.

Device

Figure 2:
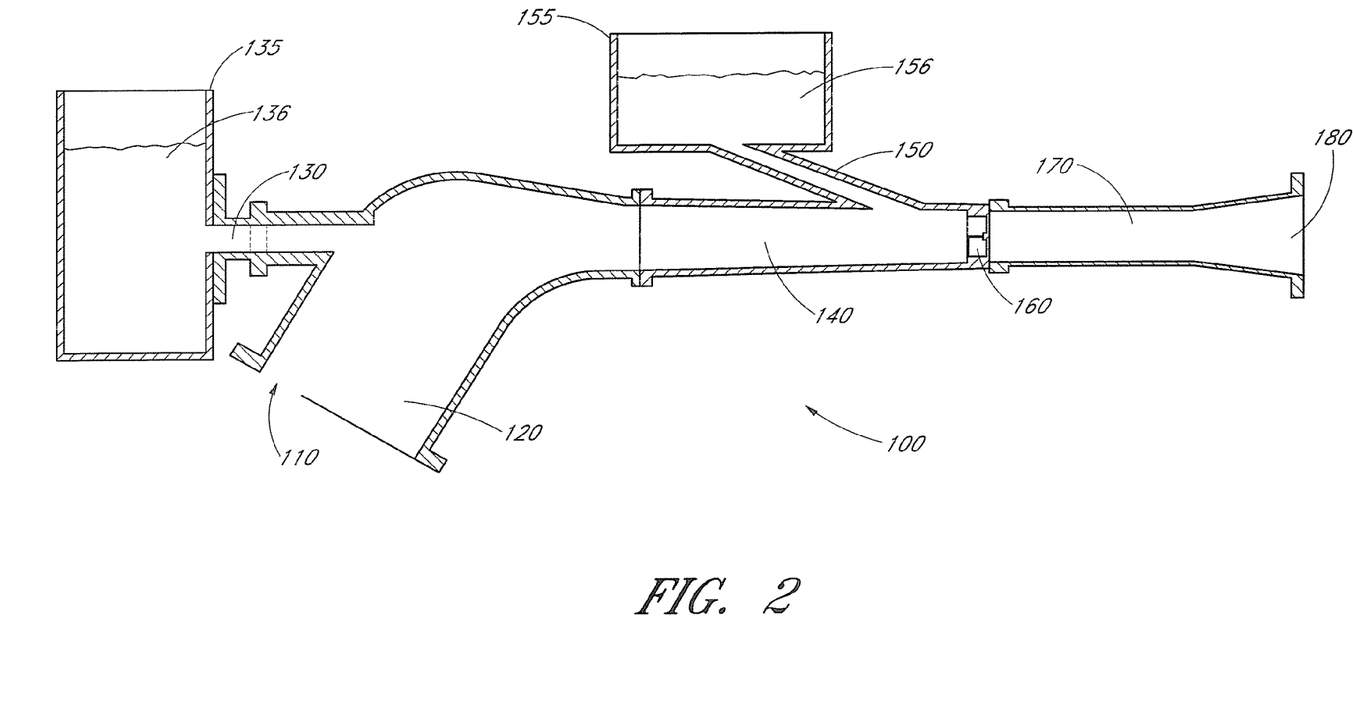
FIG. 2 is a depiction of some embodiments of a dewatering and/or solidification device.
Figure 3:
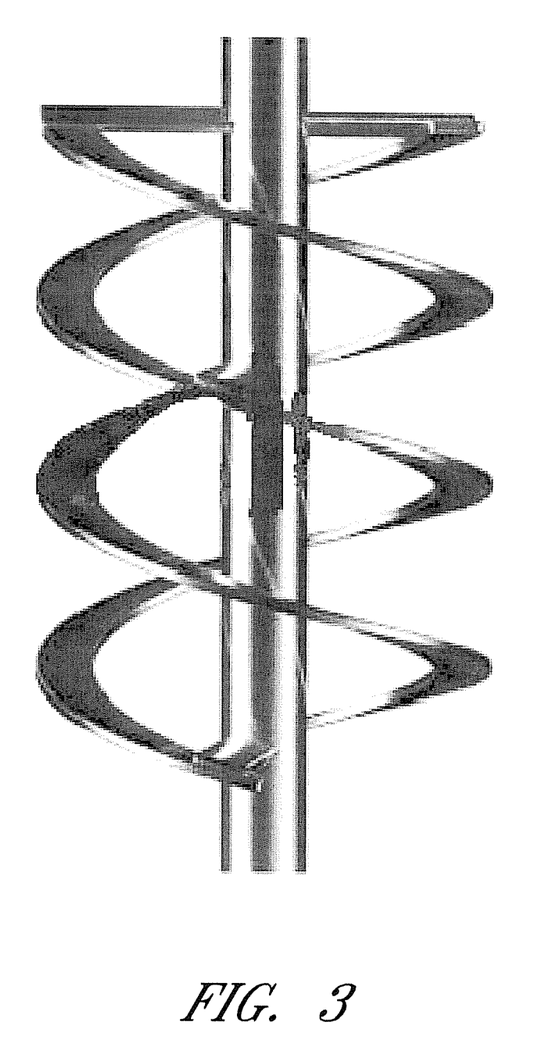
FIG. 3 is a depiction of an embodiment of a spiral stirring device.

In some embodiments, a device is provided. Some embodiments of the device 100 are shown in FIG. 2. As shown in FIG. 2, in some embodiments, the device 100 includes a first inlet 110 configured to receive sludge, a second inlet 130 configured to receive a gelling agent 136, a gelling agent reservoir 135 in communication with the second inlet 130. The gelling agent reservoir 135 can contain the gelling agent 136. The device 100 can also include a mixing chamber 140 in communication with the first inlet 110 and the second inlet 130, and a third inlet 150 configured to receive a dewatering agent 156. The third inlet 150 can be configured to open into the mixing chamber 140. The device 100 can also include a dewatering agent reservoir 155 in communication with the third inlet 150. The dewatering agent reservoir 155 can contain the dewatering agent 156. In some embodiments, the mixing chamber 140 includes an outlet 180 configured to allow a substance including the gelling agent and the dewatering agent to be removed from the mixing chamber 140. In some embodiments, the device 100 also includes a stirring device 160 configured to stir the substance in the mixing chamber. In some embodiments, the stirring device is that depicted in FIG. 3. In some embodiments, any spiral mixing device can be employed. In some embodiments, the size and/or shape of the stirring device depends upon the specific application in question. In some embodiments, the device 100 also includes a diffuser chamber 170 in communication with the mixing chamber 140.

Additional Embodiments

In some embodiments, the dewatering and consolidating of hydraulic-filled sludge involves: a dewatering treatment of the sludge; and the incorporation of a solidifying agent for carrying out a reinforcing treatment by stirring it with huge stirring equipment. In some embodiments, the process is not divided into two parts and instead can occur at overlapping points in time. In some embodiments, the present methods and/or devices avoid long construction periods and/or high construction costs. In some embodiments, the 1) fluidization treatment to a sludge to achieve its pumping, 2) incorporation of a solidifying agent during pumping to form a slurry, and 3) incorporation of a dewatering aid therein, allows for the rapid dewatering-solidifying of sludge.

In some embodiments, the process involves two parts: (1) a construction process, a fluidization treatment of the dredged sludge to make it pumpable (for hydraulic land-fill) to a place where soil material can be desired, and (2) a formulation of a solidification treating agent—a formulation of a gelling agent with cement clinker as its main gelling component and a dewatering aid with polyethylene oxide as its main component. In some embodiments, the process includes the use of cement clinker and polyethylene oxide to assist and/or accelerate the solidification and/or dewatering of a sludge.

In some embodiments, the methods provided herein can be employed in coastal areas. In some embodiments, this can be especially advantageous in locations where there is not an adequate amount of soil and rocks for traditional land-filling, where it would be hard for a large amount of soil and stone to be obtained locally, or if long-distance transportation would not be economical. In such situations, the present approach, as applied to dredged sludge, can be especially useful for carrying out a solidification treatment to change the sludge into soil with desirable engineering properties.

In some embodiments, the methods herein provide a simple process with low construction costs. With a traditional sludge treatment process, the sludge can be first dewatered (for example, using various physical processes, including vacuum dewatering, pre-pressing dewatering, hot drying dewatering, etc., and such processes often take a few months or even a few years) to a relatively low water content, and then a gelling agent can be added and mixed by large stirring equipment to carry out a solidifying treatment. In some embodiments, the method can carry out dewatering and solidifying as one process, without using large stirring equipment. This can greatly shorten the construction period, and reduce costs. In some embodiments, the processes occur concurrently.

EXAMPLES

Example 1

Solidification of Sludge

The present example outlines a method for solidifying sludge. A volume of sludge is provided. The sludge is fluidized by adding additional water to the sludge to thereby form a fluidized sludge. A gelling agent that includes the following: cement clinker, fly ash, lime, gypsum and sodium sulfate at a ratio of 30%:60%:4%:3%:3% respectively is added to the fluidized sludge in an amount sufficient to form a slurry. A dewatering agent is added to the slurry. The dewatering agent includes the following: polyethylene oxide, polyacrylamide, alkylphenol polyethylene ether and lignosulfonate, at concentrations of 1%, 1%, 1% and 17%, respectively, in an amount sufficient to dewater the slurry, thereby solidifying the sludge. The sludge is then allowed to set, thereby rapidly forming a solidified sludge.

Example 2

Solidification of Dredge Sludge

The present example outlines a method of solidifying dredged sludge. A volume of sludge is dredged from a river bed. The dredged sludge is fluidized by adding 200% water to the sludge to make it flowable and pumpable. One then mixes in a gelling agent in an amount of 5% by weight of the sludge at the inlet end of the transporting pump to for a slurry of a high water content. The gelling agent can include silicate cement clinker, fly ash of grade II or higher, industrial grade gypsum, quicklime powder, and industrial grade sodium sulfate. One can then incorporate a dewatering aid liquid in an amount of 0.03% by weight of the sludge at the end of the transporting pump. The dewatering agent includes 2% polyethylene oxide, 2% polyacrylamide, 1% alkylphenol polyethylene ether and 12% lignosulfonate. One can then pump (by hydraulic land-filling) the slurry mixture to a place where soil material is desired, so as to achieve the rapid dewatering-solidifying and to produce a strength.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for solidifying sludge comprising:
   providing a sludge;
   fluidizing the sludge to form a fluidized sludge;
   adding a gelling agent to the fluidized sludge in an amount sufficient to form a slurry; and
   adding a dewatering agent to the slurry in an amount sufficient to dewater the slurry, thereby solidifying the sludge.

2. The method of claim 1, further comprising:
   applying the slurry with dewatering agent to a location; and
   allowing the slurry with dewatering agent to solidify at the location into a solidified sludge.

3. The method of claim 1, wherein the slurry can solidify within 7 days after adding the dewatering agent.

4. The method of claim 1, wherein an amount of the gelling agent used is less than 10% by weight of the fluidized sludge.

5. The method of claim 1, wherein the dewatering agent comprises a flocculant.

6. The method of claim 5, wherein the flocculant includes at least one of a polyethylene oxide or a polyacrylamide.

7. The method of claim 1, wherein the dewatering process occurs concurrently with a solidifying process.

8. The method of claim 1, wherein the fluidized sludge comprises a water content between 180% to 300% by weight of the dredged sludge.

9. The method of claim 1, wherein the gelling agent comprises concrete.

10. The method of claim 1, wherein the gelling agent comprises at least one of: cement clinker, fly ash, lime, gypsum, sodium sulfate, or any combination thereof.

11. The method of claim 10, wherein the gelling agent comprises cement clinker, fly ash, lime, gypsum, and sodium sulfate.

12. The method of claim 11, wherein the gelling agent comprises 20-50% cement clinker, 40-70% fly ash, 4-10% lime, 2-6% gypsum, and 4-6% sodium sulfate by weight of all of the ingredients.

13. The method of claim 1, wherein the dewatering agent includes a flocculant and a surfactant, wherein the flocculant includes at least one compound selected from the group consisting of: polyethylene oxide and polyacrylamide, and wherein the surfactant includes at least one compound selected from the group consisting of: alkylphenol polyethylene ether and lignosulfonate.

14. The method of claim 13, wherein the concentration by weight of dewatering agent is 1-3% polyethylene oxide, 0.5-3% polyacrylamide, 0.5 to 1% alkylphenol polyethylene ether, and 10-25% lignosulfonate.

15. The method of claim 13, wherein the dewatering agent is 0.01-0.05% by weight of the slurry.

16. The method of claim 1, wherein the gelling agent, the dewatering agent, and the sludge are all combined in a single chamber.

17. The method of claim 1, wherein the dewatering agent comprises a surfactant and a flocculant.

18. The method of claim 17, wherein the surfactant comprises at least one of an alkylphenol polyethylene ether and a lignosulfonate.

* * * * *